May 5, 1925. 1,536,971

H. W. PIERCE

PISTON

Filed April 29, 1924

WITNESSES
William P. Goebel
E. L. Mueller

INVENTOR
Howard W. Pierce.
BY Munn & Co
ATTORNEYS

Patented May 5, 1925.

1,536,971

UNITED STATES PATENT OFFICE.

HOWARD W. PIERCE, OF BUTTE, MONTANA.

PISTON.

Application filed April 29, 1924. Serial No. 709,856.

*To all whom it may concern:*

Be it known that I, HOWARD W. PIERCE, a citizen of the United States, and a resident of Butte, in the county of Silver Bow and State of Montana, have invented a new and Improved Piston, of which the following is a full, clear, and exact description.

This invention relates to improvements in pistons, and has particular reference to a piston for internal combustion engines.

In my former Patent No. 1,383,849, dated July 5, 1921, there is disclosed a piston formed of sections of different materials, one of the sections carrying a wrist pin and the other section having a bridge forming a support for the pin whereby the side thrust of the piston is sustained by the latter section.

In the present invention it is also proposed to form the piston of at least two sections and to provide an improved and simple construction for securing the sections together.

Another object is to so construct the piston that the sections thereof may be readily assembled and disassembled and compensation made for excessive wear which may occur on certain of said sections.

The above and other objects will appear more clearly from the following detailed description, when taken in connection with the accompanying drawing, which illustrates preferred embodiments of the inventive idea.

In the drawing—

Figure 1:
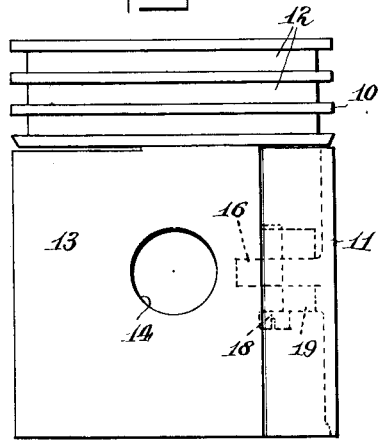
Figure 1 is a side elevation of a piston constructed in accordance with the invention.
Figure 2:
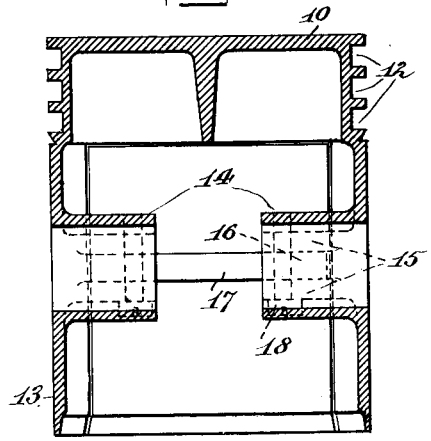
Figure 2 is a section on the line 2—2 of Figure 1.
Figure 3:
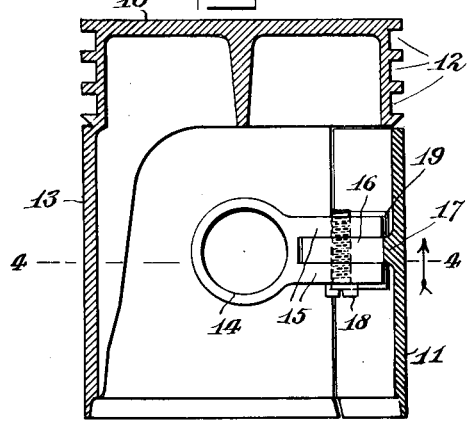
Figure 3 is a section taken at right angles to Figure 2.

In Figures 1 to 4 the improved piston is shown as consisting of upper and lower sections 10 and 11 which are combined to form a cylindrical structure, the upper section 10 having the usual grooves 12 for receiving piston rings. The upper section 10 is preferably made of aluminum while the lower section is composed of cast iron or other similar cast metal. The depending or lower portion 13 of the upper section 10 which combines with the section 11 to form the cylindrical body portion of the piston is provided at diametrically opposed points and intermediate the upper and lower ends hereof with inwardly projecting bearings 14 aligned to receive the usual wrist pin utilized to connect the piston to the crank shaft of the engine.

The means for securing the sections 10 and 11 together, which comprises the essential features of the present invention, consists of two laterally projecting extensions 15 formed upon one side of each bearing 14 and extending beyond the adjacent vertical edge of the portion 13 and toward the inner wall of the section 11. The extensions 15 of each bearing 14 are spaced from each other and are capable of having interposed therebetween a similar extension 16 projecting inwardly from the wall of the section 11 adjacent a vertical edge of the latter section. These extensions 16 of the section 11 are at the ends of a flange 17 formed integral with the section 11 intermediate the upper and lower ends thereof. The extensions 15 and 16 are provided with aligned openings for receiving the screws or other fastening devices 18 which may be introduced from the lower or open end of the piston thus greatly facilitating the connection of the sections of the piston together and also disassembling the same when desired. When the sections are assembled the adjacent vertical edges thereof are slightly spaced to compensate for varying expansion and contraction of the aluminum and cast iron of which said sections are composed. Furthermore, the cast iron section 11 is arranged with respect to the portion 13 of the section 10 so that the greatest wear due to the thrust of the connecting rod attached to the wrist pin will be borne by the section 11. By this arrangement it will be obvious that should the section 11 become excessively worn it may be removed and replaced by a new section. To compensate for slight wear upon the section 11 the connection between the sections 10 and 11, including the extensions 15 and 16, is such that a shim or shims 19 may be introduced between the free extremities of the extensions 15 and the adjacent wall of the section 11 to adjust the section 11 outwardly so that its outer surface will be flush with the outer surface of the portion 13 of the section 10. Each of the shims has one end thereof interposed between the adjacent vertical edges of the sections 10 and 11 and said shim is bifurcated so that the furcations thereof will be arranged on opposite sides of the extension 16.

Figure 5:
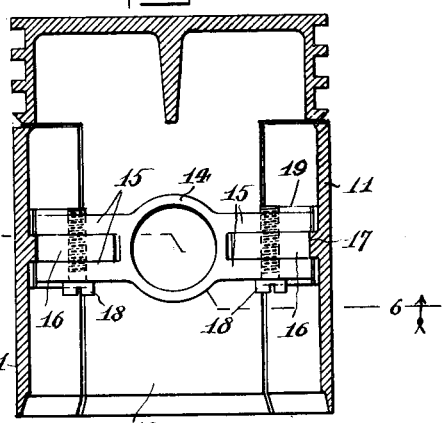
Figure 5 is a section similar to Figure 3 showing a slightly different form of the invention.
Figure 4:
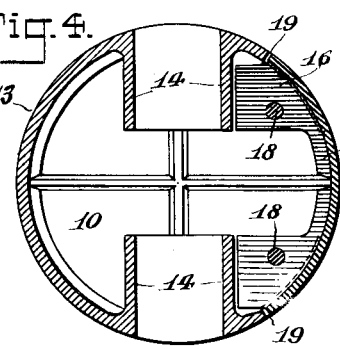
Figure 4 is a section on the line 4—4 of Figure 3.
Figure 7:
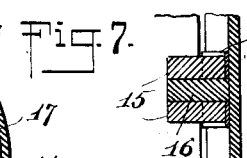
Figure 7 is a section on the line 7—7 of Figure 6.
Figure 6:
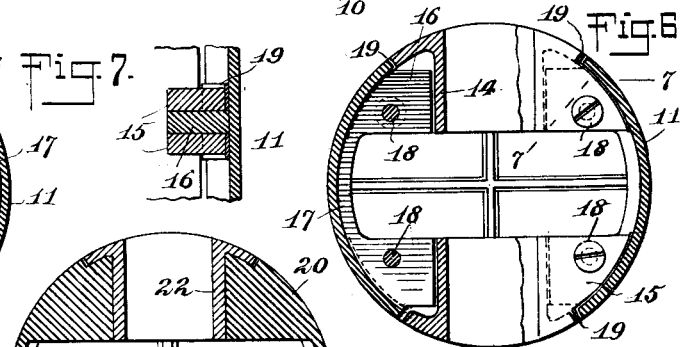
Figure 6 is a section on the line 6—6 of Figure 5.

In the form of the invention shown in Figures 5 and 6 the piston is provided with two cast iron sections 11 instead of one, as shown in Figure 5, and said sections are oppositely disposed with respect to each other and the additional section is connected to the section 10 in the same manner as previously set forth.

Figure 8:
Figure 8 is a section similar to Figure 4 showing another form of the invention.

In Figure 8 the iron section 20 is first cast and then placed into a mold and the aluminum section 21 then cast around the section 20 so as to form the aligned bearing portions 22 for receiving the wrist pin.

What is claimed is:

1. A piston including sections combining to form a body portion having an open end, one of said sections being provided with aligned bearings and each bearing having spaced lateral extensions, the other section also having a lateral extension interposed between the extensions of each bearing, and means capable of being introduced through the open end of said body portion and projected through said extensions to secure the sections of the piston together.

2. A piston including sections formed of different materials, one of the sections being provided with alined bearings and spaced lateral extensions projecting from each bearing and the other section having lateral extensions interposed between the said spaced extensions, screws passing through the extensions of the sections, and shims between the extensions of the bearings and the wall of the other section.

3. A piston comprising sections of different materials, the upper section having a grooved upper end and a depending portion provided with alined bearings, each of which is provided with outwardly projecting and spaced lugs, and the other section being provided with inwardly projecting lugs extending between the spaced lugs, and screws securing the said lugs together.

HOWARD W. PIERCE.